United States Patent [19]

Koseki et al.

[11] Patent Number: 4,746,437

[45] Date of Patent: May 24, 1988

[54] METHOD AND APPARATUS FOR CONCENTRATION AQUEOUS SOLUTION AND METHOD AND APPARATUS FOR RECOVERING TEMPERATURE

[75] Inventors: Yasuo Koseki, Hitachiohta; Sankichi Takahashi, Hitachi; Katsuya Ebara, Mito; Osamu Kuroda; Hideaki Kurokawa, both of Hitachi, all of Japan

[73] Assignee: Hitachi, Ltd., Tokyo, Japan

[21] Appl. No.: 704,577

[22] Filed: Feb. 22, 1985

[30] Foreign Application Priority Data

Feb. 27, 1984 [JP] Japan ................... 59-37086

[51] Int. Cl.$^4$ ........................... B01D 13/00
[52] U.S. Cl. .................... 210/640; 159/DIG. 27; 203/DIG. 17
[58] Field of Search ............. 310/300; 290/1 R; 60/649, 673; 62/4, 76, 101; 210/640, 774, 790; 55/158; 159/DIG. 27; 203/10, 11, 99, DIG. 17; 202/174, 173, 236, 266

[56] References Cited

U.S. PATENT DOCUMENTS

| | | | |
|---|---|---|---|
| 3,043,891 | 7/1962 | Stuckey | 210/640 X |
| 3,340,186 | 9/1967 | Weyl . | |
| 3,649,467 | 3/1972 | Winsel et al. | 210/321.2 X |
| 4,062,197 | 12/1977 | Hester | 62/101 |
| 4,152,904 | 5/1979 | Hester | 62/495 X |
| 4,193,267 | 3/1980 | Loeb | 60/649 |
| 4,199,445 | 4/1980 | Chiang et al. | 210/640 |

FOREIGN PATENT DOCUMENTS

47-7829   3/1972   Japan ................... 62/101

OTHER PUBLICATIONS

Isshiki, N. et al. "Energy Conversion and Storage By CDE. . ." Proceedings, The 12th *Interscience Energy Conversion* Eng. Conf., Wash. D.C. Aug. 28-Sep. 2, 1977 (Am. Nvc. Society, LaGrange Park, Ill.) pp. 1117-1124.

Sourirajan, S. *Reverse Osmosis and Synthetic Membranes*, Nat. Res. Con. Canada, NRCC No. 15627, 1977, pp. 61 and 62.

Wakao, N., et al., "A Nitric Acid Cycle Process. . .", In *Thermal Power Generation*, vol. 28, No. 11, Nov. 1977, pp. 1091-1096.

*Primary Examiner*—Frank Sever
*Attorney, Agent, or Firm*—Antonelli, Terry & Wands

[57] ABSTRACT

The method and apparatus for concentration aqueous solution in accordance with the present invention is characterized in that a hydrophobic porous membrane through which vapor can permeate, but not liquid, is brought into contact with an aqueous solution containing a solute at a concentration of at least 30%, and the water contained in the aqueous solution at the interface with the membrane is evaporated and permeates through the membrane. A method and an apparatus of recovering temperature of an aqueous solution comprising an aqueous solution concentration step in which the aqueous solution contact with the membrane, the water being evaporated; and a dilution step in which the resultant concentrated solution is diluted; wherein a temperature is obtained higher or lower than that of said aqueous solution. The method and apparatus for concentrating an aqueous solution can be used as a means or apparatus for concentrating an aqueous solution in a dilution type of heat pump, an absorption type of heat pump or an absorption type of refrigerator. Aqueous solutions for high-temperature outputs of dilution systems include aqueous solutions of sulfuric acid, nitric acid, etc., and for low-temperature outputs include aqueous solutions of potassium nitrate, sodium nitrate, etc. and further for absorption systems include aqueous solutions of NaClO$_3$, lithium bromide, etc.

16 Claims, 5 Drawing Sheets

METHOD AND APPARATUS FOR CONCENTRATION AQUEOUS SOLUTION AND METHOD AND APPARATUS FOR RECOVERING TEMPERATURE

BACKGROUND OF THE INVENTION

This invention relates to a method and apparatus for concentrating an aqueous solution, and also to a method and apparatus for obtaining heat energy which is higher or lower than that of the concentrated aqueous solution, by diluting the concentrated solution.

The method and apparatus for concentrating an aqueous solution in accordance with the present invention can also be utilized as a method and apparatus for separating the water contained in the aqueous solution therefrom.

The method and apparatus for concentrating an aqueous solution in accordance with the present invention can be used, for example, as a means or apparatus for concentrating an aqueous solution in a dilution type of heat pump, an absorption type of heat pump or an absorption type of refrigerator.

Heat is generated when water is added to aqueous solutions of certain acids such as sulfuric or nitric acid. A process of obtaining high-temperature heat energy from a low-temperature heat source by utilizing this property is known.

The heat generated by the dilution of an aqueous solution of sulfuric or nitric acid increases greatly with increased concentration of the sulfuric or nitric acid. It is therefore necessary to dilute a high-concentration aqueous solution in order to obtain high-temperature heat energy, and hence a method of obtaining a high-concentration aqueous solution is important.

A boiling evaporation method is known as one method of obtaining a highly concentrated solution by concentrating an aqueous solution. Such a boiling evaporation method and a process of generating high-temperature heat energy using this method are described in, for example, the magazine "Thermal Power Generation", Vol. 28, No. 11, Nov. 1977, pp. 1091–1096.

This reference discloses a circulation process in which an aqueous solution containing nitric acid is effected by heating the solution above its boiling point and concentrated by evaporation of a contained water, the concentrated solution is diluted, and the diluted aqueous solution is again evaporated and concentrated. The concentration of the aqueous solution containing the nitric acid is effected by heating the solution to a temperature above its boiling point in a reduced-pressure vessel kept at about 9 mmHg, so as to evaporate and remove the contained water.

This boiling evaporation method needs a heat source for heating the aqueous solution to a temperature above its boiling point, and a vacuum apparatus. Furthermore, a gas-liquid separator is also necessary because part of the aqueous solution is accompanied by the vapor and scattered.

Therefore there is a strong demand to develop a method and an apparatus which can concentrate an aqueous solution to a high concentration without resorting to a boiling evaporation method, such as one that can accomplish a high concentration containing a solute at a concentration of at least 30% from a low-concentration solution, or one that can further concentrate the high-concentrated solution to a higher concentration.

The provision of a concentrated solution of a concentration of at least 30% has technical significance when generating high- or low-temperature heat energy in a subsequent dilution step. Unless the solution is concentrated to a concentration of at least 30%, high- or low-temperature heat energy can not be obtained.

The method of concentrating an aqueous solution utilizing the boiling evaporation method has the following problems.

In a boiling evaporation method, the solution is heated to boiling point (the temperature at which the partial vapor pressure of the solution coincides with atmospheric pressure), and/or the atmospheric pressure is reduced to the partial vapor pressure of the solution in order to induce evaporation throughout the solution, and thus increase the evaporation area.

The solution must also be well stirred, and heat must be transferred rapidly in order to induce the evaporation (boiling) throughout the solution. When the solution is stirred, the temperature of a heating surface must be 20° to 80° C. (degrees of superheat) higher than the boiling point, so that large quantities of bubbles are generated from the heating surface, the solution must be well stirred by those bubbles, and evaporation must be generated on the bubble surfaces within the solution.

When an 80% aqueous sulfuric acid ($H_2SO_4$) solution is concentrated, for example, its boiling point is about 200° C. at atmospheric pressure, and hence a heat source providing at least from 220° to 280° C. is necessary to enable that degree of superheat. Since a 60% aqueous lithium bromide (LiBr) solution has a boiling point of 155° C., a heat source providing at least 175° to 235° C. is necessary to enable that degree of superheat in order to concentrate the solution by boiling evaporation at atmospheric pressure.

On the other hand, in accordance with methods using vacuum, boiling evaporation is effected at an absolute pressure of between about 50 and about 100 mmHg, from considerations of the vacuum-holding performance of a practical apparatus involving heating. When, for example, boiling evaporation is effected at an absolute pressure of 50 mmHg, the concentration unit must be sealed and kept under vacuum at between 150° and 210° C. for an 80% aqueous sulfuric acid ($H_2SO_4$) solution and between 105° and 165° C. for a 60% aqueous lithium bromide (LiBr) solution, to enable the required degree of superheat, because the temperature drop slightly.

In accordance with the boiling evaporation method, further, the aqueous solution is likely to be picked up by the resultant vapor and be lost, so that a gas-liquid separator such as a cyclone or demister must be provided. In addition, not only sulfuric acid, but also lithium bromide, becomes more corrosive with increasing temperature, so that countermeasures must also be taken to prevent corrosion of the inner surfaces of the apparatus.

The use of a hydrophobic porous membrane, through which vapor can permeate but not liquid, is known when separating water from an extremely low-concentration solution such as in a method of distilling brine. (U.S. Pat. No. 3,340,186).

This prior art reference discloses a method wherein vapor is generated from brine, this is passed through a hydrophobic porous membrane, and is thereafter cooled and condensed. The method of this kind is directed to brine solutions of concentrations of as low as 3 to 4% for the following reasons.

It is known that as salt concentration increases, the resultant rise in the boiling point is generally rapid. With surface evaporation which does not involve boiling, evaporation occurs in only an extremely thin surface layer because liquid mixing is less, and a high-concentration layer occurs locally in the surface layer (this is the concentration polarization phenomenon). This phenomenon varies according to the solute, and the rate of evaporation, etc., but a surface layer of a concentration which is several percent higher than the bulk concentration (average concentration) is formed.

When the concentration of the solution is low, the rise in the boiling point due to the concentration polarization is not very great; but when the concentration is high, the rise in the boiling point is large and evaporation from the surface layer is greatly impeded.

In an aqueous LiBr solution of a concentration of 10% (boiling point: 102° C. (point a)), for example, the boiling point rises by only 1° C., i.e. to 103° C. (point b), even when the surface layer is concentrated by 5% to 15% by concentration polarization, as shown in FIG. 4; but when a concentration of 60% (boiling point 155° C. (point c)) is concentrated by 5% to 65%, the boiling point rises by as much as 15° C., i.e. to 170° C. (point d), so that evaporation from the surface is greatly impeded.

For the reasons described above, a boiling evaporation method has been employed in the past for concentrating a high-concentration solution, because liquid mixing is less in a non-boiling evaporation method and thus concentration polarization takes place. Since the hydrophobic porons membrane method also belongs to the class of non-boiling evaporation methods, it has been primarily directed to the concentration of low-concentration solutions.

Other methods using membranes include a reverse-osmosis membrane method in which a semi-permeable membrane such as a cellulose acetate membrane is used, and an electrophoretic method in which an ion exchange membrane is used. However, these methods are not suitable for concentrating a high-concentration solution.

In the reverse-osmosis membrane method, osmotic pressure increases rapidly with an increase in concentration, and the pressurizing force necessary to provide membrane permeation becomes several hundred of kg/cm$^2$, and the concentration enabled by the membrane separation in practice is only a few percent.

In the electrophoretic method, ions in the solution are separated by electrophoresis, but the ion mobility and separability drop rapidly if the salt concentration increases. Moreover, the electrical conductivity of the solution increases and current flows more easily, so that the current efficiency drops, and the concentration that can be separated in practice is also only a few percent.

Therefore these two methods are used in practice solely for desalination, etc. Even if an attempt is made to apply these methods to the concentration of a solution to a high-concentration, they can be employed only auxiliarily in combination with evaporation concentration.

SUMMARY OF THE INVENTION

An object of the present invention is to provide a method and apparatus for concentrating an aqueous solution containing a solute at a concentration of at least 30%, without heating the aqueous solution to above its boiling point.

Another object of the present invention is to provide a method and apparatus for concentrating an aqueous solution containing a solute at a concentration of at least 30%, wherein evaporation area can be increased.

Another object of the present invention is to provide a method and apparatus for concentrating an aqueous solution containing a solute at a concentration of at least 30%, wherein concentration polarization can be prevented.

Another object of the present invention is to provide a method and apparatus for concentrating an aqueous solution containing a solute at a concentration of at least 30%, wherein a quantity of the water corresponding to the vapor pressure can be evaporated at the same temperature in a nonboiling state.

Another object of the present invention is to provide a method and apparatus for concentrating an aqueous solution containing a solute at a concentration of at least 30%, wherein the solution can not be removed and lost at atmospheric pressure.

Another object of the present invention is to provide a method and apparatus for obtaining high- or low-temperature heat energy by utilizing such a concentrated solution.

The concentration method in accordance with the present invention is characterized in that a membrane through which vapor can permeate, but not liquid, is brought into contact with an aqueous solution containing a solute at a concentration of at least 30%, and the water contained in the aqueous solution at the interface with the membrane is evaporated and permeates through the membrane.

The mechanism providing a concentration of at least 30% in the present invention is assumed to be as follows. This mechanism will be described with reference to a case in which a hydrophobic porous membrane is employed, by way of example.

Although kept in contact with the solution, the hydrophobic porous membrane does not allow the solution to come too close to it, so that the membrane and the solution are not in complete contact with each other, but are in linear or point contact. A vapor phase generated from the solution is formed at the interface between the membrane and the solution, although this is on a microscopic scale. Since the membrane is fixed, it is believed that the generation of the vapor, pressure increases and decreases due to the permeation of the vapor through the membrane, and a volume increase occur repeatedly in the vapor phase, and the interface between the solution and the vapor oscillates finely.

This is a specific phenomenon which does not occur in the evaporation from a liquid surface without a membrane. Therefore, the evaporation with the membrane of the present invention is affected by the formation of the vapor phase and by this oscillation. The formation of the vapor phase and the oscillation develop because the hydrophobic porous membrane and the solution come into microscopic contact, and consequently microscopic agitation of the solution occurs at the liquid interface in contact with the vapor phase. This microscopic agitation is believed to increase with greater surface tension exhibiting a hydrophobic property with respect to the solution.

In ordinary surface-evaporation, concentration polarization easily occurs, and concentration to a high concentration can not be accomplished because the agitation of the surface layer is less. On the other hand, in the case of liquid surface evaporation wherein a membrane is in contact with the solution, it is difficult for concentration polarization to occur because of the microscopic agitation of the surface layer. This agitation becomes more vigorous with increasing concentration because the surface tension increases. The higher the concentration and the greater the change in the coefficient of viscosity, the greater becomes the interface oscillation-agitation effect, because of the difference in the coefficient of viscosity.

Evaporation usually becomes more difficult at higher concentrations because of the boiling point increase effect resulting from concentration polarization on the surface, but when evaporating a high-concentration solution through a membrane, concentration polarization can be prevented by the microscopic oscillation and agitation on the membrane surface. The effect of this prevention increases with increasing concentration, because of the effects of the surface tension, the change in the coefficient of viscosity, etc., described above. This means that concentration of a high-concentration solution can also be realized by non-boiling evaporation through a membrane surface, in accordance with the present invention.

When concentrating a high-concentration solution using a membrane, it is preferable to minimize deformation of the membrane in order to efficiently oscillate the solution vapor interface, and apply a suitable pressure to the solution and the membrane in order to amplify the pressure changes in the vapor phase that develop on the membrane interface. It is possible to employ, as means for accomplishing these objects, a method in which the membrane is fixed, a method in which pressure is applied to the membrane surface while the liquid pressure is kept at at least 0.2 kg/cm$^2$, a method in which the membrane is brought into contact with the liquid to define microscopic spaces, and so forth.

When practising the present invention, the aqueous solution is preferably heated to a temperature below its boiling point so as to make more vigorous the evaporation of the solution at the interface. The aqueous solution is preferably heated to at least 25° C. because of preventing from condensation.

The inventors of the present invention have clarified that the evaporation mechanism in this non-boiling evaporation method is different from that in ordinary non-boiling evaporation methods, and have found that this method can sufficiently concentrate a solution of a high concentration. The present invention is completed on the basis of this finding.

An ordinary non-boiling evaporation method and the evaporation method using a membrane in accordance with the present invention are compared in Table 1 below.

TABLE 1

| | Non-boiling evaporation | Evaporation using membrane |
|---|---|---|
| Interface | | |
| Phase | Air-liquid | Air-membrane-vapor phase-liquid |
| Conditions | Static | Microscopic oscillation |
| Prevention of concentration polarization | None | Yes (interface agitation effect) |
| High concentration | | |
| Change in boiling point | Large | Large |
| Change in surface tension | Small | Large |

TABLE 1-continued

| | Non-boiling evaporation | Evaporation using membrane |
|---|---|---|
| Change in coefficient of viscosity | Large | Large |
| Microscopic oscillation-agitation | None | Yes, large |
| Concentration polarization | Large | Small |
| Evaporation ability | Decrease | Unchanged |
| Concentration | Difficult | Possible |

The inventors of the present invention have examined various means for increasing the evaporation area by methods other than boiling in the evaporation method, and have determined from fundamental experiments that if the evaporation method is combined with a membrane separation technique which enables an easy increase of the membrane area, and problem of concentration polarization which is a defect of membrane separation can be eliminated.

The essential gist of the present invention resides in that when an aqueous solution is concentrated and separated in the concentration unit of a conventional dilution or absorption type of system, heating or cooling is effected through a membrane, and the water separated by the membrane is evaporated immediately before or after it permeates through the membrane, and is removed from the membrane in a gaseous state.

The "prevaporation" method which is the essential point of the present invention, in which a combination of evaporation with membrane permeation is used, and which is applicable to the concentration unit, includes the following two methods depending on the properties of the membrane used.

In the first method, the membrane is a hydrophobic porous membrane made of a substance such as polytetrafluoroethylene (PTFE), through which water can not permeate, but vapor can, as shown in FIG. 1. Only water is evaporated by the vapor pressure from the solution 1 in the proximity of the membrane 2. The resultant vapor 4 passes through small pores 3 of the membrane 1 and is condensed to substantially atmospheric pressure on a cooling surface to separate water 6.

This method has been used in the past with low-concentration salt solutions, such as for desalination (brine containing about 3.4% sodium chloride), but has not been applied to the concentration of high-concentration solutions.

In another method, a hydrophilic non-porous membrane 7 made of a substance such as cellulose acetate, poly-sulfone, or the like, is used, as shown in FIG. 2. According to this method, specific substances in the aqueous solution 1 permeate selectively and are evaporated immediately thereafter, and the vapor 4 is condensed on the cooling surface 5 to separate the water 6.

This method utilizes two separation mechanisms, the selective permeation characteristics of the membrane and evaporation separation, and hence provides a high degree of separability. However, since membrane permeation depends upon the diffusion speeds of substances through the membrane, permeation quantities are generally small. Studies have been made on the application of this method to the separation, on a limited scale, of azeotropic mixtures which are difficult to separate by an evaporation method or a distillation method, such as aqueous alcohol solutions.

Sulfuric acid, lithium bromide, etc., to which the present invention are directed can be separated by an evaporation method, so that the hydrophobic porous membrane method which provides a larger permeation quantity is believed generally to be more advantageous.

The reason why the utilization of the hydrophobic porous membrane method has so far been limited to the separation of a low-concentration salt solutions (desalination) is presumably due to the fact that since this method is a kind of membrane separation method, it cannot concentrate a high-concentration solution.

However, the inventors of the present invention have carried out various studies on the assumption that, in accordance with the separation mechanism of the hydrophobic porous membrane method, showing in FIG. 1, the membrane has the function of ensuring an evaporation surface and passing only vapor therethrough, and the separation mechanism is the evaporation before the permeation through the membrane.

An example of results of experiments is shown in FIG. 3. The inventors have found that even an 80% aqueous sulfuric acid ($H_2SO_4$) solution or a 60% aqueous lithium bromide (LiBr) solution can be concentrated at atmospheric pressure using a membrane of a substance such as tetrafluoroethylene, by combining the membrane with non-boiling evaporation.

In FIG. 3, the vertical axis indicates vapor permeation quantity through the membrane, and the horizontal axis indicates difference in steam pressure $\Delta P$, which is the difference between steam pressure $P_1$ of the solution in the mother liquor chamber at mean temperature $T_1$ and steam pressure $P_2$ of the cooling water in the cooling water chamber at mean temperature $T_2$. This difference in the steam pressure $\Delta P$ may be regarded qualitatively as a temperature difference. The 80% aqueous $H_2SO_4$ solution or the 60% aqueous LiBr solution can be concentrated same as water. Therefore, the present invention using the membrane has less concentration polarization and can be separated using the concentrated solution.

The apparatus for concentrating an aqueous solution in accordance with the present invention includes a membrane through which vapor can permeate, but not liquid, an aqueous solution chamber positioned on one side of the membrane in contact therewith, and a vapor chamber positioned on the other side of the membrane.

The method and apparatus for concentrating an aqueous solution in accordance with the present invention can be applied to a variety of systems in which heat energy is generated by utilizing a difference in concentrations of an aqueous solution. Some of these systems are:

(1) Systems in which high-temperature energy is generated, including (a) a dilution type of heat pump utilizing the absorption of heat of dilution of a concentrated aqueous solution which generates heat when diluted with water, such as sulfuric or nitric acid, a typical fundamental system thereof is depicted in FIG. 5, and (b) an absorption type of heat pump which utilizes the vapor absorptivity of a concentrated aqueous solution of lithium bromide, lithium chloride, or the like, and a typical fundamental system thereof is depicted in FIG. 7: and (2) Systems in which low-temperature energy is generated, including (a) a dilution type of cold generation system utilizing the absorption of heat of dilution of a concentrated aqueous solution, such as potassium nitrate or sodium nitrate, which absorbs heat when diluted by water, a typical fundamental system being the same as that dilution type of heat pump described above, and (b) an absorption type of heat generation system called on "absorption refrigerator", in which the same system as that of the absorption type of heat pump (FIG. 7) is used, but the charge and withdrawal of the heat is reversed in a dilution step.

As described above, the fundamental systems necessary for generating high- and low-temperature energy include the dilution type shown in FIG. 5 and the absorption type shown in FIG. 7. The high- or low-temperature energy can be generated by changing the aqueous solution used (dilution type), and by changing the quantity of heat removed in the dilution step.

The dilution system will be explained in detail with reference to FIG. 5. The fundamental system consists of a concentration unit 101 for the aqueous solution and a dilution unit 102. The concentration unit 101 is separated from a cooling surface 5 by the membrane 1, and includes solution chamber or a mother liquor chamber 25, an evaporation chamber 26, and a cooling water chamber 27. A concentrated aqueous solution (hereinafter called a "concentrated solution") 11 and water (or a considerably diluted aqueous solution of a concentration of less than 1%) 12 are mixed in the dilution unit 102 to provide heat generation or absorption and high- or low-temperature energy 200 is removed therefrom.

The diluted aqueous solution (hereinafter called a "diluted solution") 13 thus mixed and diluted is concentrated in the concentration unit 101, is again separated into the concentrated aqueous solution 11 and water 12, and is thereafter recycled back to the dilution unit 102.

The principle of the dilution type of device will be described using as an example a case in which high-temperature energy is obtained. An aqueous solution of sulfuric acid or the like generates heat when mixed with, and diluted by, water. This is because the heat of infinite dilution of the aqueous solution (the quantity of heat generated when the aqueous solution is diluted infinitely so as to bring its concentration close to 0%) increases rapidly with increasing concentration, as shown in FIG. 6.

When, for example, 80% (point a) sulfuric acid is diluted by 10% to 70% (point b) by the addition of water, the difference in the heat of infinite dilution is the quantity of heat generated, and heat of dilution of 31 kc$^{al/kg}$ can be obtained. When 50% (point c) sulfuric acid is similarly diluted by 10% to 40% (point d), however, the difference in heat of infinite dilution is only 14 kcal/kg. Therefore the use of a high-concentration aqueous solution provides a higher temperature, and is more advantageous than the dilution type of system.

This also holds true of the case in which an aqueous solution of potassium nitrate or the like, which has a negative heat of dilution (heat absorption), is used to obtain low-temperature energy. The higher the concentration, the greater the difference in the heat of dilution. Therefore, a lower temperature can be obtained more advantageously by using an aqueous solution of a higher concentration.

For the reasons given above, the performance of the dilution type of system depends upon whether or not an aqueous solution can be concentrated to a high concentration by the concentration unit 101.

The absorption type of system will now be described in detail with reference to FIG. 7. The fundamental system consists of the concentration unit 101 and the dilution unit 102. The concentration unit 101 is the same as that of the dilution type of system shown in FIG. 5. The dilution unit 102 consists of an evaporation chamber 24 and an absorption chamber 23.

The principle of the absorption type of system lies in the utilization of the hygroscopicity of an aqueous solution of lithium bromide or the like. When vapor is absorbed by its concentrated solution within a sealed space, heat is generated by the heat of condensation and the heat of dilution. The absorption type of system utilizes this mechanism, and is classified into the following two methods. One generates high-temperature energy (absorption type of heat pump), and the other generates low-temperature energy (absorption type of refrigerator), utilizing the phenomenon that vapor pressure is reduced by the condensation heat and the heat of dilution, and the water evaporates at a lower temperature.

A specific example using an aqueous lithium bromide solution will be described below. A 60% aqueous lithium solution is fed into the absorption chamber 23 of the dilution unit 102 of FIG. 7, the water is fed into the evaporation chamber 24 and the interior of the chamber is kept under vacuum.

Since the partial vapor pressure of lithium bromide with its high hygroscopicity is low, it is not evaporated, but only the water within the evaporation chamber 24 is evaporated at the same temperature, so that the water within the evaporation chamber is deprived of its latent heat of evaporation, and the temperature drops. On the other hand, the lithium bromide within the absorption chamber 23 absorbs the vapor 28 generated in the evaporation chamber 24, and its temperature is increased by the heat of condensation and the heat of dilution.

This phenomenon can be explained with reference to the vapor pressure diagram for aqueous lithium bromide solutions shown in FIG. 8. When, for example, low-temperature energy of about 50° C. is supplied to the evaporation chamber 24 and the water is evaporated at 40° C. (point a), the absolute pressure within the dilution unit 102 reaches 57 mmHg.

The resultant vapor is absorbed by a 60% (point b) aqueous lithium bromide solution, and simultaneously heat is generated. Assume that the concentration of the aqueous solution becomes 55% (point c). The absorption temperature becomes 75° C., and high-temperature energy at about 70° C. can be obtained from the absorption chamber 23.

If the 55% aqueous lithium bromide solution in the absorption chamber 23 is deprived of heat from outside and is cooled and held at 40° C. (point d), on the other hand, the absolute pressure within the unit drops to 9.3 mmHg, so that the evaporation of the water inside the evaporation chamber 24 becomes vigorous, the temperature drops to about 10° C. (point e), and lower-temperature energy at about 15° C. can be obtained from the evaporation chamber 24.

The partial vapor pressure of hygroscopic aqueous solutions usually drops rapidly as the concentration increases, and the temperature difference between the supplied energy and the resultant energy is large. This means that the performance of the absorption system depends upon how the aqueous solution is concentrated to a high concentration by the concentration unit.

As described above, in the absorption type of system, water removed in the concentration unit 101 enters the evaporation chamber 24, where it evaporates so that the temperature drops, and the resultant vapor 14 is absorbed in the absorption chamber 23 by the concentrated solution 11 supplied from the concentration unit 101, to generate heat, in the same way as in the dilution type of system.

In order to obtain higher-temperature energy, heat must be supplied to prevent the temperature of the evaporation chamber 24 dropping, and, by so doing, energy of a temperature higher than the supplied heat can be obtained from the absorption chamber 23.

In order to obtain low-temperature energy, on the other hand, heat of a lower temperature than that of the absorption chamber must be supplied to prevent the temperature of the absorption chamber 23 dropping, and the absorption chamber 23 must be deprived of heat for cooling. By so doing, heat at a lower temperature than that of the supplied heat (cooling) can be obtained from the evaporation chamber 24.

The water 12 supplied to the evaporation chamber 24 of the dilution unit 102 is converted into vapor 104, and is absorbed by the concentrated solution 11 within the absorption chamber 23. The diluted solution 13 reenters the concentration unit 101 and is separated into water 12 and the concentrated solution 11.

The concentration method and apparatus of the present invention can be applied as a concentration unit in both the dilution type of system and the absorption type of system.

Since the present invention makes it possible to concentrate an aqueous solution at a lower temperature than in prior-art methods, the variety of aqueous solutions that can be treated is wider.

Aqueous solutions for high-temperature outputs of dilution systems include aqueous solutions of sulfuric acid, nitric acid, hydrochloric acid, sodium hydroxide, potassium hydroxide, zinc nitrate, ethanol, methanol, etc. Aqueous solutions for low-temperature outputs include aqueous solutions of potassium nitrate, sodium nitrate, potassium iodide, KNCS, NaNCS, sodium hypochlorite (NaClO), ammonium nitrate ($NH_4NO_3$), etc.

For absorption systems, aqueous solutions include aqueous solutions of $NaClO_3$, lithium bromide, lithium chloride, manganese chloride, zinc chloride, magnesium chloride, calcium chloride, magnesium bromide, zinc bromide, copper bromide, calcium bromide, etc.

The membrane used in the concentration unit of the present invention may be a hydrophobic porous membrane, and polytetrafluoroethylene is suitable therefor because it has strong hydrophobic properties. However other porous membranes can be used after their surfaces are subjected to a hydrophobic treatment by plasma polymerization or the like.

Although the diameter of the pores in the porous membrane is preferably large, from considerations of permeation quantity, it is preferably at most 5 $\mu$m because water will permeate through it and the quality of the permeation water will be deteriorated if the pore diameter is larger than 5 $\mu$m. The pore diameter must, of course, be larger than that necessary for the permeation of the vapor.

In connection with the hydrophobic property of the membrane, its water-resistant permeation pressure with respect to water is suitably at least 0.2 kg/cm. The size of the gap between the membrane and the cooling surface has a large effect on the permeation performance, but a gap of between about 1 and about 10 mm is suitable from the point of view of the separation performance.

There is no specific upper limit to the pressure, so long as the membrane is not broken thereby.

The present invention can apply to various concentration units. For example, (1) plane plate type unit which is piled on two pairs consisting of non-porous plates and porous membranes by turns and such unit comprises a mother liquor chamber between the porous membranes, a cooling chamber between the non-porous plates, and a steam chamber between the porous membranes and the non-porous plates; (2) double tubular type unit which comprises a inner tube (membrane surface) made of a porous membrane, a middle tube (cooling surface made of a non-porous tube, and an outer tube wherein a mother liquor chamber is formed by inside of the middle tube, a steam chamber is formed between the inner tube and the middle tube, and a cooling chamber is formed between the middle tube and the outer tube; and (3) multi-tubular type unit which is inserted a bundle of non-porous tubes (cooling surface) and a bundle of tubes (membrane surface) made of a porous membrane in a vessel wherein a cooling chamber is formed by inside of the non-porous tube, a mother liquor chamber is formed by inside of the porous membrane tube, and a steam chamber is formed in the vessel excluding the non-porous tubes and the porous membrane tube. The principle structure of the membrane surface and the cooling surface comprises a member formed the steam chamber therein, and the part of inner wall surface thereof is formed the cooling (condensation) surface not including the membrane surface.

As described above, the present invention can concentrate an aqueous solution containing sulfuric or nitric acid etc. at a high concentration, without heating it above its boiling point.

High- or low-temperature energy can be obtained with little added heat energy by applying this concentration method to a high- or low-temperature energy generation system consisting of an aqueous solution concentration step and a step of diluting a concentrated solution.

DETAILED DESCRIPTION OF THE PREFERRED EMBODIMENTS:

The present invention will be described in detail with reference to some embodiments thereof using a hydrophobic porous membrane, but the invention can be similarly applied to a hydrophilic membrane, and is not specifically limited to a hydrophobic membrane.

Figure 9:
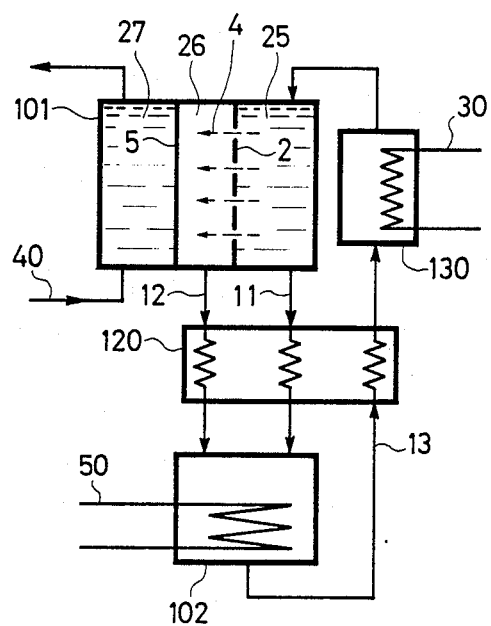
FIG. 9 is a block diagram of the construction of a dilution type of energy generation apparatus in accordance with still another embodiment of the present invention.

The dilution system will now be described with reference to FIG. 9. The apparatus consists principally of the concentration unit 101, the dilution unit 102, and a heat exchanger 120. The concentration unit is separated from the cooling surface by the membrane 2, and includes a mother liquor chamber 25, an evaporation chamber 26, and a cooling water chamber 27.

After being heated by hot water 30, or the like, in a heat recovery chamber 130 (which may be positioned inside the mother liquor chamber 25), a diluted solution 13 enters the mother liquor chamber 25, and vapor is evaporated to its partial vapor pressure at that temperature in the proximity of the membrane 2. Thus the diluted solution 13 is concentrated to form the concentrated solution 11. The resultant vapor 4 passes through the pores of the membrane, enters the vapor chamber 26 which is at substantially atmospheric pressure, and is condensed on the cooling surface 5 to water 12. Cooling water 40 is supplied to the cooling water chamber 27, and the vapor 4 is deprived of its heat of condensation by the cooling surface 5.

The cooled and condensed water 12 leaving the vapor chamber 26 and the hot concentrated solution 11 leaving the mother liquor chamber 25 are pre-heated by hot diluted solution 13 in the heat exchanger 120, and then enter the dilution unit 102. The concentrated solution 11 is mixed with water 12 in the dilution unit 102, and generates heat with this dilution. Thus the concentrated solution 11 becomes high-temperature diluted solution 13 and is sent back to the concentration unit. The heat generated in the dilution unit 102 is removed from the system as high-temperature water 50.

Figure 10:
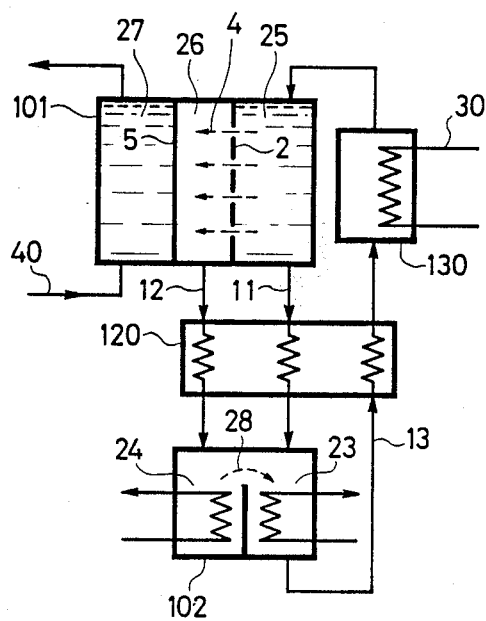
FIG. 10 is a block diagram of the construction of an absorption type of energy generation apparatus in accordance with a further embodiment of the present invention.

The absorption system will now be described with reference to the embodiment shown in FIG. 10. The absorption system consists of the concentration unit 101 and the dilution unit 102, in the same way as in the dilution type of system. The concentration unit 101 is the same as that of the dilution type of system, is separated from the membrane 2 on the cooling surface 5, and consists of the mother liquor chamber 25, the vapor chamber 26, and the cooling water chamber 27. The dilution unit 102 consists of the evaporation chamber 24 and the absorption chamber 23.

After being heated by hot water 30 or the like in the heat recovery device 130 (which may be positioned inside the mother liquor chamber 25), the diluted solution 13 enters the mother liquor chamber 25. Its water content is evaporated to its partial vapor pressure at that temperature in the proximity of the membrane 2, and is concentrated to provide the concentrated solution 11. The resultant vapor 4 passes through the small pores of the membrane, then enters the vapor chamber 26 which is at substantially atmospheric pressure, and is cooled and condensed on the cooling surface 5 to water 12. Cooling water 10 is supplied to the cooling water chamber 27, and the vapor 4 is deprived of its heat of condensation by the cooling surface 5.

In order to obtain higher-temperature energy, the water 12 leaving the vapor chamber 26 and the hot concentrated solution 11 leaving the mother liquor chamber 25 are pre-heated by the hot diluted solution in the heat exchanger 120, and then enter the dilution unit 102. The pre-heated water 12 is heated and evaporated by external heat of a relatively low temperature in the evaporation chamber 24. The resultant vapor 28 is absorbed by the concentrated solution 11 in the absorption chamber 23, where heat is generated by the heat of condensation of the vapor and the heat of dilution of the concentrated solution, and, at the same time, the solution becomes the diluted solution 13 and is sent back to the concentration unit 101. Hot water 50 of a higher temperature can be obtained by recovering the heat generated in the absorption chamber 23.

In order to obtain lower-temperature energy, the water 12 leaving the evaporation chamber 26 and the hot concentrated solution 11 leaving the mother liquor chamber 25 are pre-cooled by the cold diluted solution in the heat exchanger 120, and then enter the dilution unit 102. The pre-heated concentrated solution 11 enters the absorption chamber 23, and attempts to generate heat by absorbing the vapor 28. However, the internal pressure of the dilution unit 101 drops if the absorption chamber is cooled from outside by heat of a relatively low temperature. On the other hand, the pre-cooled water enters the evaporation chamber 24, whose internal pressure thus drops, and is evaporated, so that its temperature drops and absorbs external heat. The temperature extracted inside the evaporation chamber 24 is lower than the temperature of the heat applied to the absorption chamber 23, and hence cold heat, can be obtained. The diluted solution 13 diluted in the absorption chamber 23 is sent back to the concentration unit 101.

The system of the present invention as described above differs from the conventional system in its concentration unit. Since the conventional unit employs a boiling evaporation method, it is necessary to raise the temperature or reduce the pressure of the solution being processed so that it reaches boiling point, and to further super-heat it in order to generate bubbles. Therefore, a heat source of an extremely high temperature is necessary conventionally.

However, the essential point of the present invention is that a larger evaporation surface is obtained by the use of a hydrophobic porous membrane, and a quantity of the water corresponding to the vapor pressure is evaporated at the same temperature in a non-boiling state.

As a result, the present invention makes it possible to eliminate the problem of the low evaporation speed of the conventional simple evaporation method (non-boiling) by increasing the membrane surface, that is, the evaporation surface. The present invention can simultaneously eliminate the problem of the necessity of a high-temperature heat source in accordance with the conventional boiling evaporation method, by employing a non-boiling system. In other words, the present invention can eliminate the necessity of heating or reducing the pressure of the solution to bring it to boiling point, and the necessity of super-heating to generate bubbles.

Figure 1:
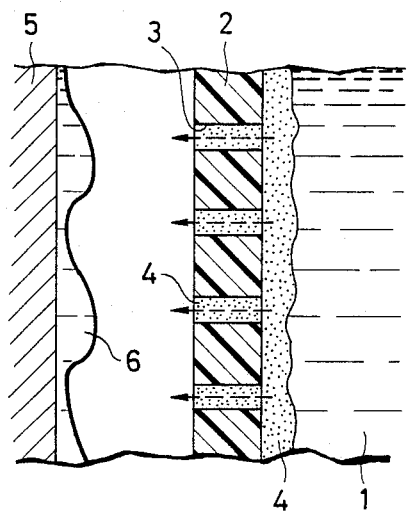
FIG. 1 is a schematic view of the concentration mechanism when the concentration method of the present invention is realized using a hydrophobic porous membrane.
Figure 2:
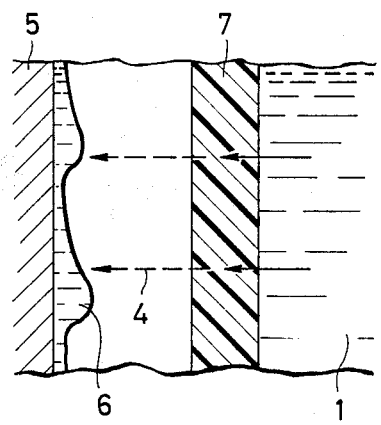
FIG. 2 is a schematic view of the concentration mechanism when the concentration method of the present invention is realized using a hydrophilic non-porous membrane.
Figure 3:
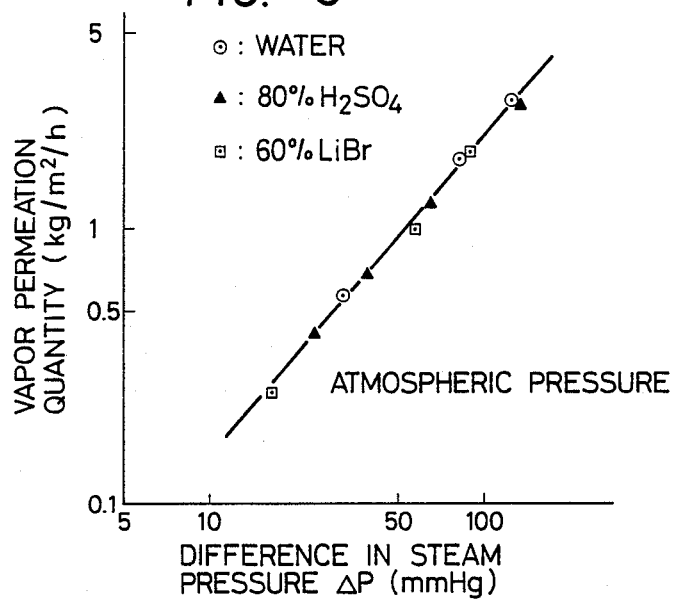
FIG. 3 is a graph of the relationship between difference in vapor pressures and vapor permeation quantity.
Figure 4:
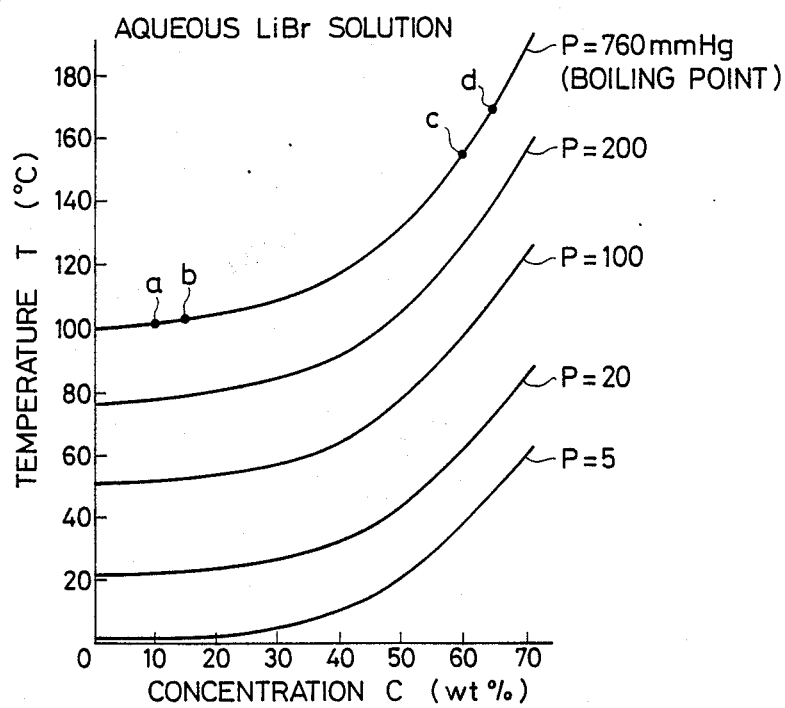
FIG. 4 is a graph of the relationship between the concentration of an aqueous LiBr solution and boiling point.
Figure 5:
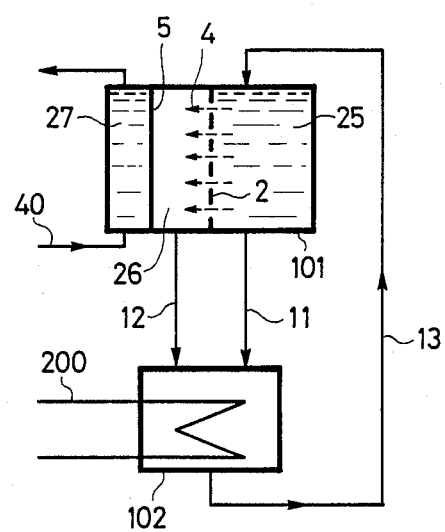
FIG. 5 is a block diagram of the construction of a dilution type of energy generation apparatus in accordance with one embodiment of the present invention.
Figure 6:
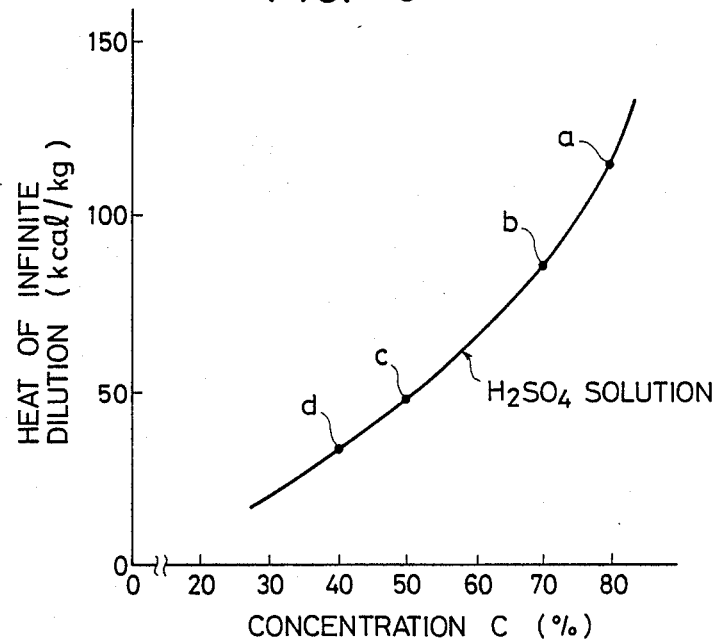
FIG. 6 is a graph of the relationship between the concentration of an aqueous solution and its heat of infinite dilution during the dilution process.
Figure 7:
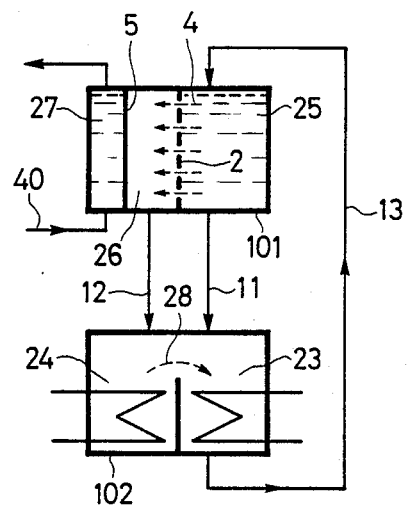
FIG. 7 is a block diagram of the construction of an absorption type of heat generation apparatus in accordance with embodiment of the present invention.
Figure 8:
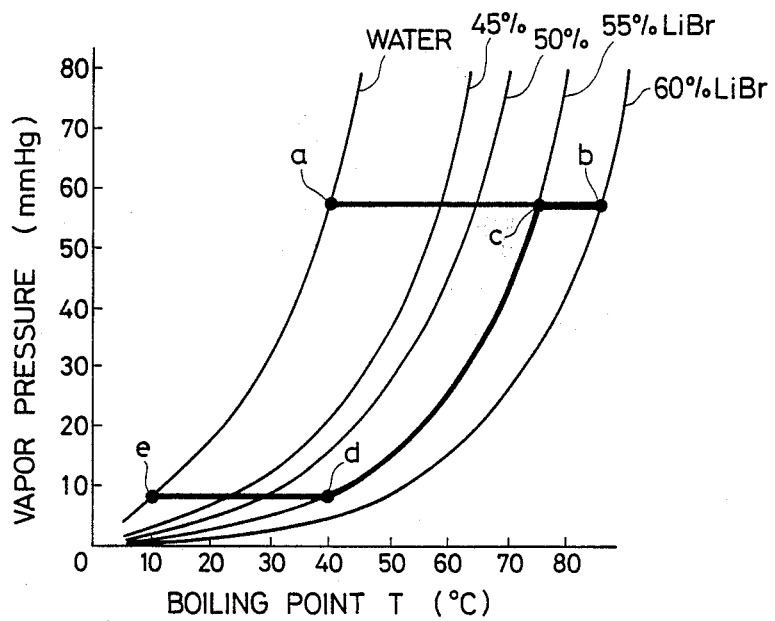
FIG. 8 is a graph of the relationship between boiling point of an aqueous solution and vapor pressure.

The present invention exhibits the effect of greatly reducing the temperature of the heating source, because only a difference in vapor pressure is necessary for moving the vapor, as shown in FIG. 3. Since the present invention employs a non-boiling method, it provides further advantages in that the method can be worked at atmospheric pressure, the solution is not removed and lost, the size of the concentration unit can be made compact because the membrane area can be increased easily, and so forth.

The following illustrates one of the effects of the present invention, in conjunction with the reducing in heating temperature, with reference to embodiments dealing with the concentration of an 80% aqueous sulfuric acid solution, and of a 60% aqueous lithium bromide solution. In the present invention, the difference in partial vapor pressure is set to 20 mmHg and the cooling temperature is set to 20° C., in order to transfer the vapor.

EXAMPLE 1

Concentration of 80% $H_2SO_4$

|  | Prior art (boiling evaporation method) | | The present invention |
| --- | --- | --- | --- |
| Heat temperature (°C.) | 150~210 | 220~280 | 121 |
| Internal pressure (mmHg) | 50 (Vacuum) | 760 (Atmospheric pressure) | 760 (Atmospheric pressure) |

EXAMPLE 2

Concentration of 60% LiBr

|  | Prior art (boiling evaporation method) | | The present invention |
| --- | --- | --- | --- |
| Heat temperature (°C.) | 105~165 | 175~235 | 78 |
| Internal pressure (mmHg) | 50 (Vacuum) | 760 (Atmospheric pressure) | 760 (Atmospheric pressure) |

What is claimed is:

1. A method comprising: providing an alternative to heating an aqueous solution above its boiling temperature in order to concentrate a solute in said solution to at least 30%, by, contracting aqueous solution concentration step in which an aqueous solution containing a solute at a concentration of at least 30% by weight with a membrane through which vapor can permeate, but not liquid, the water contained in said aqueous solution being evaporated at an interfacing of the aqueous solution with said membrane and the vapor permeating through said membrane, said membrane being a hydrophobic porous membrane having pores therethrough, the pores having a size such that the vapor can pass through the pores but the aqueous solution cannot pass through the pores, the aqueous solution being heated to a temperature below the boiling point thereof; and diluting the resultant concentrated solution from said aqueous solution concentration step so as to obtain a temperature higher or lower than that of said aqueous solution.

2. The method of recovering temperature of an aqueous solution as defined in claim 1, wherein said solute is sulfuric or nitric acid, and heat is generated in said dilution step.

3. The method of recovering temperature of an aqueous solution as defined in claim 1, wherein said solute is lithium bromide or lithium chloride, and vapor is absorbed into said concentrated solution in said dilution step to generate heat.

4. The method of recovering temperature of an aqueous solution as defined in claim 1, wherein said solute is potassium nitrate or sodium nitrate, and a low temperature is obtained by utilizing the absorption of heat of the dilution of said concentrated solution in said dilution step.

5. The method of recovering temperature of an aqueous solution as defined in claim 1, wherein said dilution of said concentrated solution in said dilution step is done using condensation of said vapor separated in said concentration step.

6. The method of recovering temperature of an aqueous solution as defined in claim 1, wherein said aqueous solution diluted in said dilution step is recirculated to said aqueous solution concentration step.

7. The method of recovering temperature of an aqueous solution as defined in claim 1, wherein the aqueous solution containing a solute at a concentration of at least 30% is contained in an aqueous solution chamber, positioned at one side of said membrane, during said contacting; and the evaporated water permeated through said membrane passes into a vapor chamber positioned on the side of the membrane opposite said one side.

8. The method of recovering temperature of an aqueous solution as defined in claim 1, wherein higher-temperature energy is generated in said dilution step, and said higher-temperature energy is recovered.

9. The method of recovering temperature of an aqueous solution as defined in claim 1, wherein lower-temperature energy is generated in said dilution step, and said lower-temperature energy is recovered.

10. The method of recovering temperature of an aqueous solution as defined in claim 1, wherein the membrane is made of polytetrafluoroethylene.

11. The method of recovering temperature of an aqueous solution as defined in claim 1, wherein the pore diameter of the hydrophobic porous membrane is at most 5 $\mu$m.

12. The method of recovering temperature of an aqueous solution as defined in claim 1, wherein the permeation pressure, with respect to water, of the hydrophobic porous membrane is at least 0.2 Kg/cm.

13. The method of recovering temperature of an aqueous solution as defined in claim 1, wherein, in said dilution step, the vapor is absorbed by said concentrated solution and heat is generated by latent heat of condensation of the vapor and heat of dilution of said concentrated solution, whereby a high temperature is obtained.

14. The method of recovering temperature of an aqueous solution as defined in claim 13, wherein, in evaporating the water contained in said aqueous solution, water within the evaporation chamber is deprived of its latent heat of evaporation, so as to obtain a low temperature.

15. The method of recovering temperature of an aqueous solution as defined in claim 1, wherein, in evaporating the water contained in said aqueous solution, the water within the evaporation chamber is deprived of its latent heat of evaporation, so as to obtain a low temperature.

16. The method of recovering temperature of an aqueous solution as defined in claim 1, wherein in providing the aqueous solution in contact with the membrane, the surface layer of solution is subjected to microscopic agitation, whereby concentration polarization is avoided.

* * * * *